United States Patent [19]

Erbes

[11] Patent Number: 5,737,379
[45] Date of Patent: Apr. 7, 1998

[54] REACTOR CORE SHROUD REPAIR USING THERMALLY TENSIONED RING TO APPLY COMPRESSION ACROSS SHROUD VERTICAL SEAM WELDS

[75] Inventor: John Geddes Erbes, Mt. View, Calif.

[73] Assignee: General Electric Company, San Jose, Calif.

[21] Appl. No.: 804,503

[22] Filed: Feb. 21, 1997

[51] Int. Cl.⁶ .................................................. G21C 11/00
[52] U.S. Cl. .................................... 376/302; 376/287
[58] Field of Search ................................ 376/260, 287, 376/293, 294, 296, 302

[56] References Cited

U.S. PATENT DOCUMENTS 4,409,179  10/1983  Burger ........................... 376/302
5,623,526  4/1997  Wivagg ........................... 376/302

*Primary Examiner*—Daniel D. Wasil
*Attorney, Agent, or Firm*—James E. McGinness; Dennis M. Flaherty

[57] ABSTRACT

An apparatus for repairing the core shroud of a nuclear reactor having one or more cracked vertical seam welds. The repair involves installation of a ring around the circumference of the shroud while the reactor is shutdown. The ring is tensioned with a mechanical preload and then vertically supported with shear bolts or struts. The ring is made of an alloy having a coefficient of thermal expansion less than the coefficient of thermal expansion of the shroud material. When the reactor returns to operation, the consequent temperature rise causes the shroud to expand more than the ring expands. As a result the ring exerts a circumferential compressive load across any cracks in the vertical seam welds intersected by the ring.

18 Claims, 6 Drawing Sheets

REACTOR CORE SHROUD REPAIR USING THERMALLY TENSIONED RING TO APPLY COMPRESSION ACROSS SHROUD VERTICAL SEAM WELDS

FIELD OF THE INVENTION

This invention relates to maintenance and repair of nuclear reactors. In particular, the invention relates to the repair of the fuel core shroud of a boiling water reactor.

BACKGROUND OF THE INVENTION

A conventional boiling water reactor is shown in FIG. 1. Feedwater is admitted into a reactor pressure vessel (RPV) 10 via a feedwater inlet 12 and a feedwater sparger 14. The feedwater flows downwardly through the downcomer annulus 16, which is an annular region between RPV 10 and a core shroud 18. The core shroud 18 is a stainless steel cylinder which surrounds the nuclear fuel core 20, which is made up of a plurality of fuel bundle assemblies 22 (only two 2×2 arrays of which are shown in FIG. 1). Each array of fuel bundle assemblies is supported at the top by a top guide 24 and at the bottom by a core plate 26.

The water flows through downcomer annulus 16 to the core lower plenum 25. The water subsequently enters the fuel assemblies 22, wherein a boiling boundary layer is established. A mixture of water and steam enters the core upper plenum under the shroud head 28. The steam-water mixture flows through standpipes 30 and enters steam separators 32.

The BWR also includes a coolant recirculation system which provides the forced convection flow through the core necessary to attain the required power density. A portion of the water is sucked from the lower end of the downcomer annulus 16 via recirculation water outlet 34 and forced by a centrifugal recirculation pump (not shown) into jet pump assemblies 36 (only one of which is shown) via recirculation water inlets 38. The jet pump assemblies are circumferentially distributed around the core shroud 18.

Stress corrosion cracking (SCC) is a known phenomenon occurring in reactor components, such as structural members, piping, fasteners, and welds, exposed to high-temperature water. The reactor components are subject to a variety of stresses associated with, e.g., differences in thermal expansion, the operating pressure needed for the containment of the reactor cooling water, and other sources such as residual stress from welding, cold working and other inhomogeneous metal treatments. In addition, water chemistry, welding, heat treatment, and radiation can increase the susceptibility of metal in a component to SCC.

In particular, stress corrosion cracking has been found in the vertical seam welds or heat affected zones thereof in the core shroud 18. This diminishes the structural integrity of the shroud, which vertically and horizontally supports core top guide 24 and shroud head 28. Thus, there is a need for a method and an apparatus for repairing a shroud which has cracks in or near the vertical seam welds.

SUMMARY OF THE INVENTION

The present invention is an apparatus for repairing a shroud in which one or more vertical seam welds have experienced SCC. The repair involves the placement of a tensioned segmented or linked ring around the circumference of the shroud during shutdown of the reactor. The ring is placed at an elevation so that it bridges the cracked vertical weld seam, thereby allowing transmission of seismic shear and pressure loads across the weld joint. Multiple rings can be placed along the length of a cracked vertical seam weld. The number of rings installed along a given vertical seam weld can be determined based on the space available and the magnitude of the loads anticipated.

In accordance with a first preferred embodiment of the invention, the ring comprises a multiplicity of arc-shaped ring segments pivotably coupled end to end, and a turnbuckle pivotably coupled to the terminal ring segments. Each coupling comprises a hinge pin oriented generally vertically. The radius of curvature of each ring segment is greater or less than the radius of the shroud for optimum hoop stiffness. This initial curvature mismatch is lessened, but not eliminated during subsequent tensioning of the ring, i.e., under circumferential loading, the curved segment will bend to more closely match the curvature of the mating shroud, and extend circumferentially by more than due to only the average hoop strain in the segment cross section. This mechanism provides an adjustable design feature to add circumferential flexibility to the ring. The residual curvature mismatch allows the ring segments to flex toward the shroud in response to thermal transient events, minimizing changes in the ring tension. Thus, the ring is able to flex without exceeding design stress limits or losing required preload.

In accordance with a second preferred embodiment, the ring comprises a chain of arc-shaped ring links tensioned by a turnbuckle. The ring links are pivotably coupled in series by link couplings. Each link coupling comprises two parallel side plates connected by two parallel pivot pins. Each pivot pin is loosely inserted in a hole formed in an end of the adjacent arc-shaped ring link. As above, the hoop stiffness of the assembly may be optimized by varying the amount of bending induced in the curved ring links due to circumferential loading. The turnbuckle is used to apply a desired initial installation preload tension to the ring. It comprises a pair of opposed threaded connectors attached to clevises which are pivotably coupled to the respective terminal ring links by respective clevis pins.

During installation of the segmented or linked ring, the reactor is shutdown and at a relatively low temperature, e.g., about 100° F. One step in the installation procedure is to preload the ring sufficiently to hold it in place with relatively low tension by manipulating the turnbuckle. When the installation procedure is completed, the reactor is restarted and the temperature inside the reactor rises to about 530° F. In accordance with the invention, the ring is made of a material having a coefficient of thermal expansion which is less than the coefficient of thermal expansion of the shroud material. Therefore, as the temperature rises inside the reactor, the shroud and ring undergo differential thermal expansion, to wit, the shroud expands more than the ring. As a result, the mechanically tensioned ring experiences an increase in tension due to differential thermal expansion. The mechanically and thermally tensioned ring applies a circumferential compressive force across the vertical seam welds intersected by the ring. The magnitude of that circumferential compressive force is a function of the respective coefficients of thermal expansion, the magnitude of the temperature increase, the outside circumference of the shroud and the stiffness of the ring segments or links. Variation in the mismatch between the curvatures of the mating segment and shroud surfaces may be used to achieve optimum operating preload to support the shroud loads without exceeding ring design stresses.

In accordance with another aspect of the invention, support means are provided for ensuring the vertical location of the ring. These vertical support means also support the weight of the ring in the event that the ring loses tension during severe transients, thermal or neutron fluence-induced creep or loss of frictional stabilization due to vibratory excitations in the reactor. In accordance with one preferred embodiment, the vertical support means comprise a plurality of shear bolts which are used to fasten the ring to the shroud at a plurality of azimuthal positions. Alternatively, the ring can be supported at a plurality of azimuthal positions by respective vertical locating struts which stand on the shroud support plate.

The shroud repair rings in accordance with the present invention are designed to withstand the thermal and radiological conditions which the shroud is subjected to. Further, the shroud repair rings are designed and installed such that removal of jet pump inlet mixers and RPV beltline inspection can be performed without removing the repair rings.

These shroud repair designs are advantageous because they allow fast installation using a minimum number of fasteners and minimum invessel machining. All steps in the installation of the shroud repair rings are performed remotely. All holes in the shroud are circular cylindrical so that machining the shroud holes, where required, is simplified. In addition, the shroud repair rings occupy little space, which minimizes the impact on other activities inside the reactor and permits installation and use in conjunction with other repairs for horizontal welds. The two configurations (segment and link) allow selection of alternate remote installation methods, based on customer preference and installation experience.

DETAILED DESCRIPTION OF THE PREFERRED EMBODIMENTS

Figure 1:
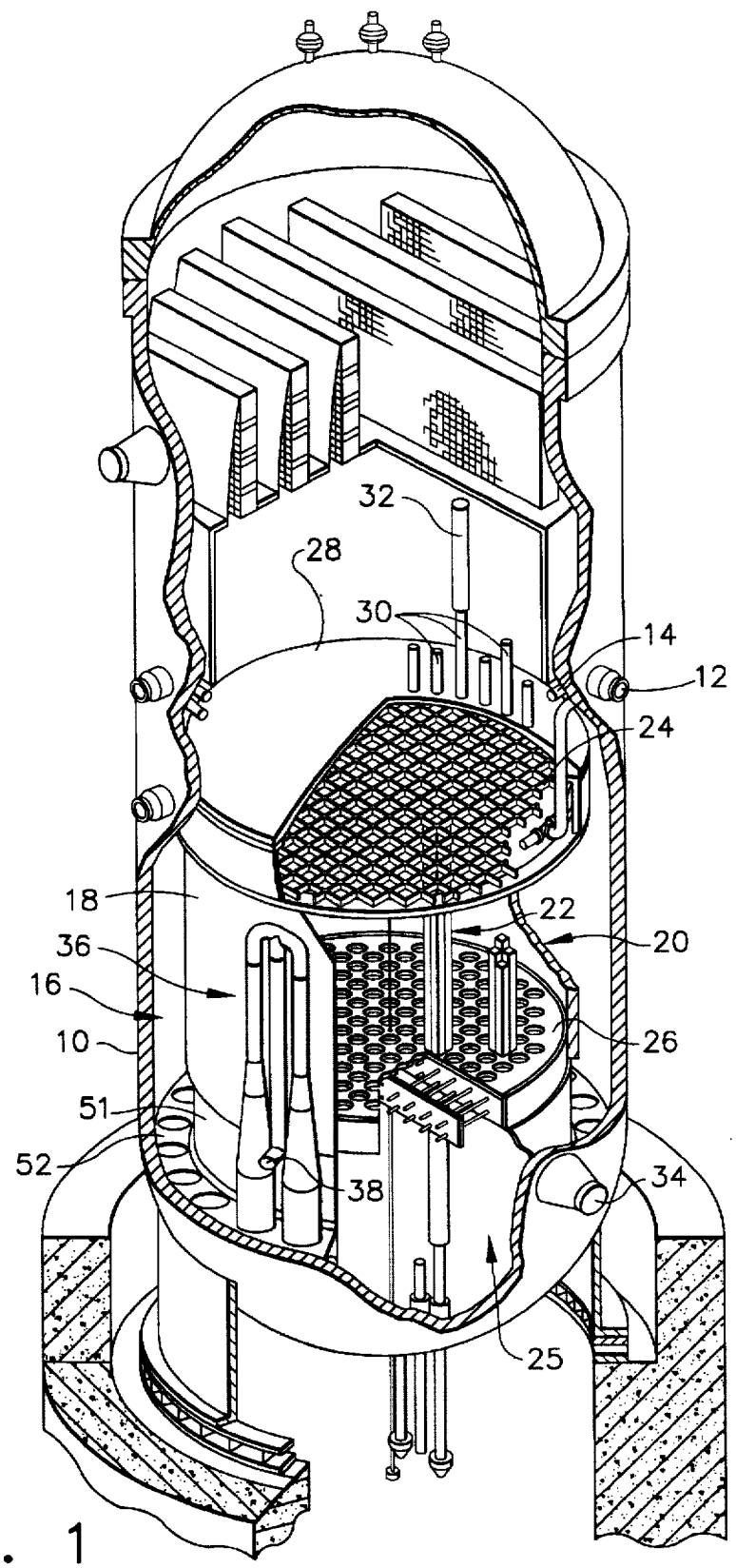
FIG. 1 is a schematic showing a partially cutaway perspective view of a conventional BWR.
Figure 2:
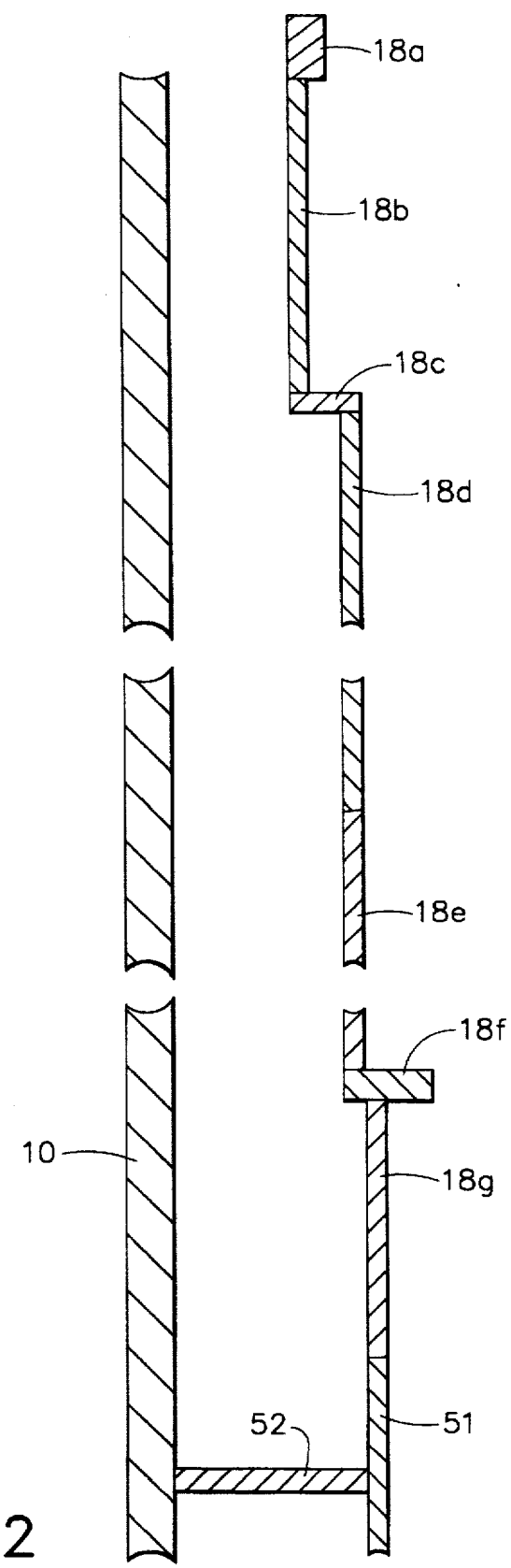
FIG. 2 is a schematic showing a sectional view of a portion of one type of BWR core shroud.

Referring to FIG. 2, one type of core shroud 18 comprises a shroud flange 18a for supporting the shroud head; a circular cylindrical upper shell section 18b welded to shroud head flange 18a; an annular top guide support ring 18c welded to upper shell section 18b; circular cylindrical top, middle and bottom mid-core shell sections 18d, 18h and 18e, with top section 18d welded to top guide support ring 18c and bottom section 18e welded to an annular core plate support ring 18f; and a lower shell section 18g welded to the core plate support ring 18f. The top, middle and bottom sections 18d, 18h and 18e of the mid-core shell section are of equal diameter. The top mid-core shell section 18d is joined to the middle mid-core shell section 18h at an upper mid-plane girth weld 50a; the bottom mid-core shell section 18e is joined to the middle mid-core shell section 18h at a lower mid-plane girth weld 50b. The diameter of upper shell section 18b is greater than the diameter of the mid-core shell sections, which are in turn greater than the diameter of lower shell section 18g. The entire shroud is supported by shroud support 51, which is welded to the bottom of lower shell section 18f, and by annular shroud support plate 52, which is welded at its inner diameter to shroud support 51 and at its outer diameter to RPV 10. All of the aforementioned welds extend around the entire circumference of the shroud and constitute the shroud girth seam welds.

Figure 3:
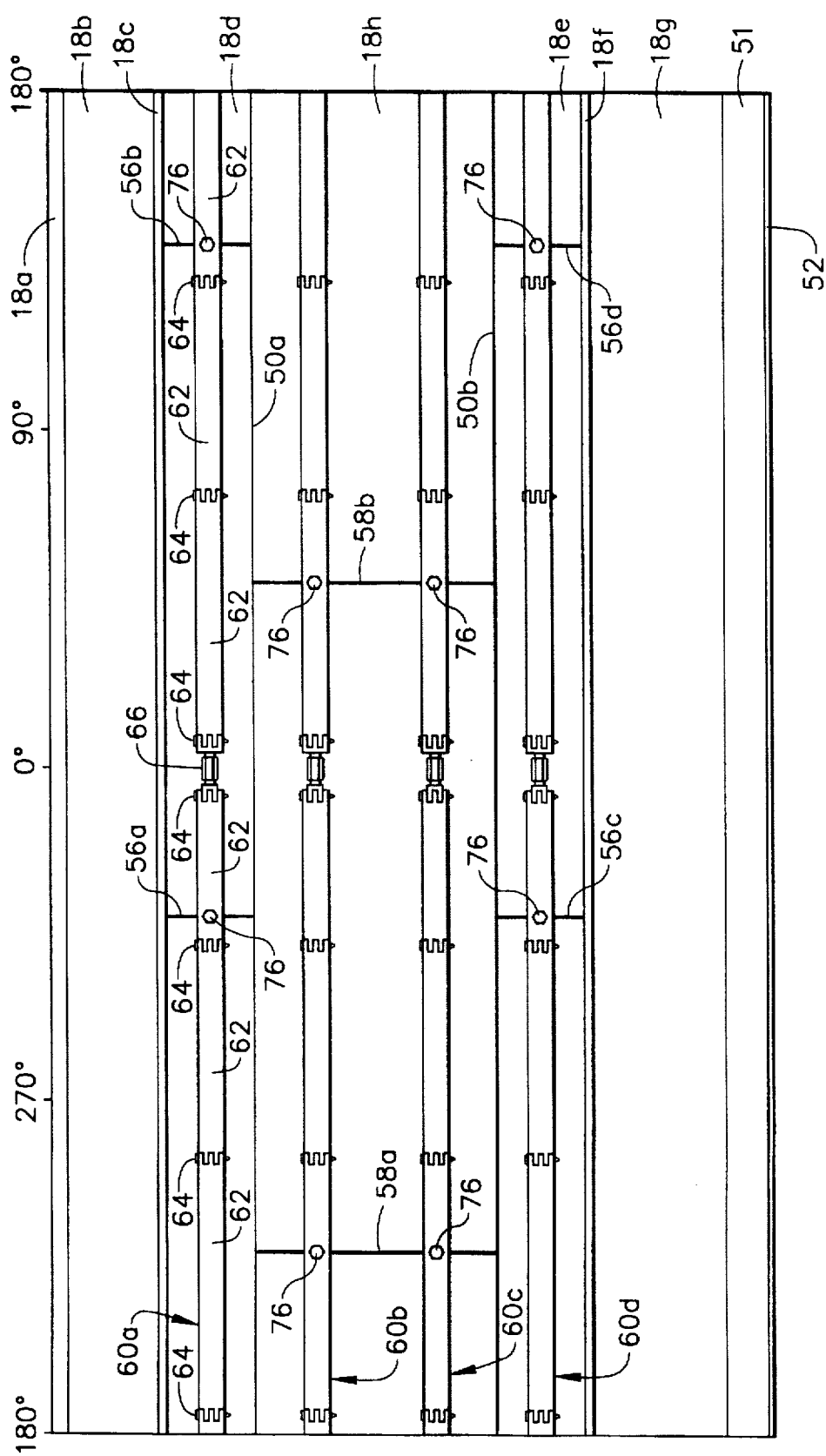
FIG. 3 is a schematic showing a developed azimuthal view of a BWR core shroud having vertical seam welds bridged by tensioned segmented rings in accordance with a first preferred embodiment of the invention.

Referring to FIG. 3, each mid-core shell section (18d, 18e and 18h) consists of two 180° half-shell sections which are joined at a pair of vertical seam welds—welds 56a, 56b for top mid-core shell section 18d; welds 58a, 58b for middle mid-core shell section 18h; and welds 56c, 56d for bottom mid-core shell section 18e. The vertical seam welds 58a, 58b are azimuthally staggered relative to the vertical seam welds 56a–56d.

Stress corrosion cracking has been found in the shroud seam welds or heat affected zones thereof. In the case of cracked vertical seam welds, one or more tensioned rings, each circumscribing the shroud at a different elevation, can be arranged along the weld length. As seen in FIG. 3, in accordance with one exemplary arrangement, a segmented ring 60a is installed at an elevation of the top mid-core shell section 18d and bridges the vertical seam welds 56a and 56b; two segmented rings 60b, 60c are installed at respective elevations of the middle mid-core shell section 18h and bridge the vertical seam welds 58a and 58b; and a segmented ring 60d is installed at an elevation of the bottom mid-core shell section 18e and bridges the vertical seam welds 56c and 56d. A similar arrangement shown in FIG. 6 utilizes linked rings 80a–80d instead of segmented rings. In both cases, each tensioned ring applies a circumferential compressive load across the vertical seam welds at a respective elevation. This reinforces the shroud, reacting the tension load from internal pressure which could otherwise open the crack along the seam weld, causing unacceptable leakage. Rings may be installed only at elevations where the vertical seam welds are cracked.

In accordance with the first preferred embodiment shown in FIG. 3, each segmented ring 60a–60d comprises a multiplicity of arc-shaped ring segments 62 pivotably coupled end to end by respective hinge pins 64. The first and last ring segments are in turn pivotably coupled to a turnbuckle 66 by respective hinge pins 64. The structure of the segmented rings in accordance with the first preferred embodiment will be described with reference to FIGS. 4 and 5, which depict the segmented ring 60a that circumscribes the top mid-core shell section 18d. The other segmented rings shown in FIG. 3 have an identical structure.

Figure 4:
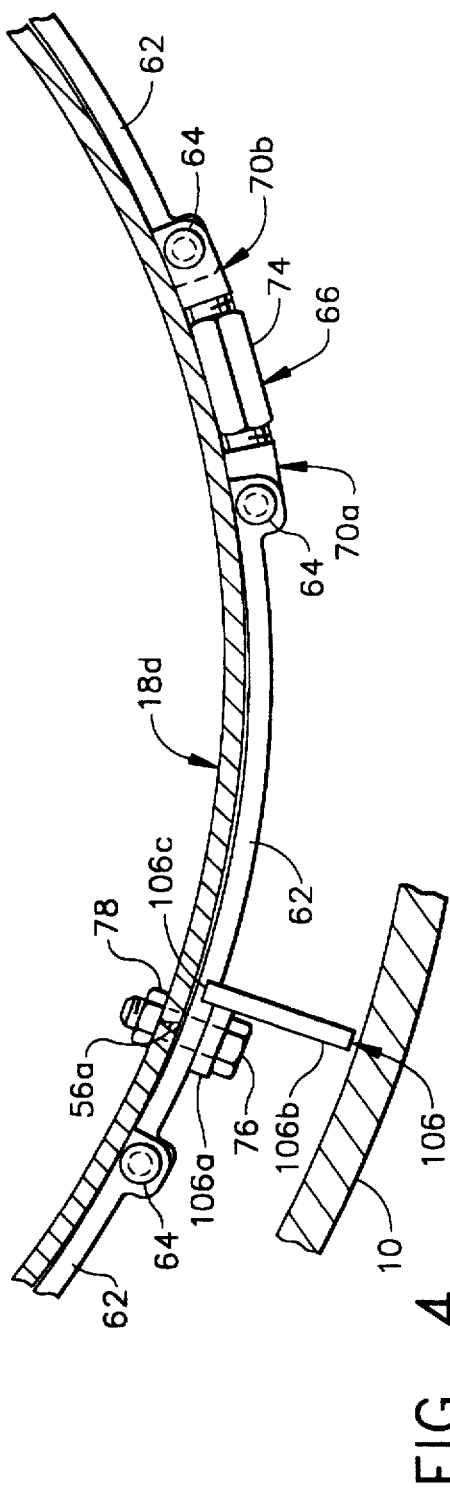
FIG. 4 is a schematic showing a sectional view of a portion of a tensioned segmented ring placed around the core shroud in accordance with the first preferred embodiment.

The ring segments in accordance with the first preferred embodiment are designed to flex under tension. As seen in FIG. 4, prior to ring tensioning each ring segment 62 has a radius of curvature less than the radius of the shroud at the ring elevation, i.e., the radius the top mid-core shell section 18d. (As used herein, the term "radius of curvature of the ring segment" refers to the inner radius of curvature of the ring segment and the term "radius of the shroud" refers to the outer radius of the shroud.) When tension is applied to the ends of each ring segment, the ring segments flex toward the shroud. However, the ring segments are designed to flex in response to the design (i.e., mechanically and thermally produced) tension by an amount less than that required for the mid-portion of the ring segment to contact the shroud. Thus, as seen in FIG. 4, in the finally installed state the shroud and ring segments have a residual curvature mismatch which allows the ring segments to flex toward or away from the shroud in response to relative thermal differential expansion from transient events that deviate from the normal operating temperature distribution. This flexibility minimizes corresponding deviation from the desired mechanically and thermally preloaded condition of ring tension.

Each ring segment 62 is pivotably coupled to the adjacent ring segment by means of a vertical hinge pin 64, which penetrates the aligned apertures of the interleaved fingers 68a and 68b integrally formed at the respective ends of the ring segments. Thus, adjacent ring segments are mutually pivotable about the axis of the hinge pin which couples them, which contributes to the flexibility of the ring. The pin connections also allow for assembly of the ring in pieces of manageable size for remote installation in the limited space access available.

The terminal ring segments are pivotably coupled to a turnbuckle 66 (shown in FIGS. 5 and 6) by respective hinge pins 64. The turnbuckle is adjusted to produce the desired initial tensile mechanical preload in the segmented ring. The turnbuckle 66 comprises a first coupling 70a connected to or integrally formed with a right-hand threaded shaft 72a and a second coupling 70b connected to or integrally formed with a left-hand threaded shaft 72b. Coupling 70a comprises fingers 74a which are interleaved with the corresponding fingers 68b of the adjacent ring segment and which are apertured for receiving a hinge pin 64. Similarly, coupling 70b comprises fingers 74b which are interleaved with the corresponding fingers 68a of the adjacent ring segment and which are apertured for receiving a hinge pin 64. The turnbuckle 66 further comprises a sleeve 74 having a right-hand thread engaged with the right-hand thread of shaft 72a and a left-hand thread engaged with the left-hand thread of shaft 72b. As a consequence, when the sleeve is rotated in the direction of ring tensioning, the threaded shafts 72a and 72b, and the ring segments coupled thereto, are pulled together.

After the ring has been assembled, the sleeve 74 of turnbuckle 66 is rotated in the direction of tensioning the ring. Sleeve 74 is rotated until the desired tensile preload is produced. This tensile preload causes the ring segments to flex toward the shroud, as described previously.

In accordance with the invention, the shafts of two shear bolts 76 extend into corresponding aligned holes in the segmented ring and underlying top mid-core shell section 18d. As shown in FIG. 4, each shear bolt 76 is fastened by means of a respective retaining nut 78. The holes in the ring are made before installation. These holes are then aligned with the vertical seam welds and may be used as guides to locate the equipment for machining aligned holes in the shroud. The holes in the shroud can be formed by electrical discharge machining or any other suitable machining technique.

Because the holes in the shroud are machined at the azimuth lines of the vertical seam welds 56a, 56b, the shear bolts inserted therein will transmit shear load while preventing relative vertical shear displacement at the edges of the welded shroud sections. The shear bolts 76 provide positive location of the segmented ring 60 relative to the shroud, blocking vertical and circumferential displacements. In addition, bolts 76 and nuts 78 position the ring positively against possible movement on the shroud due to vibratory excitation from the reactor environment.

Figure 5:
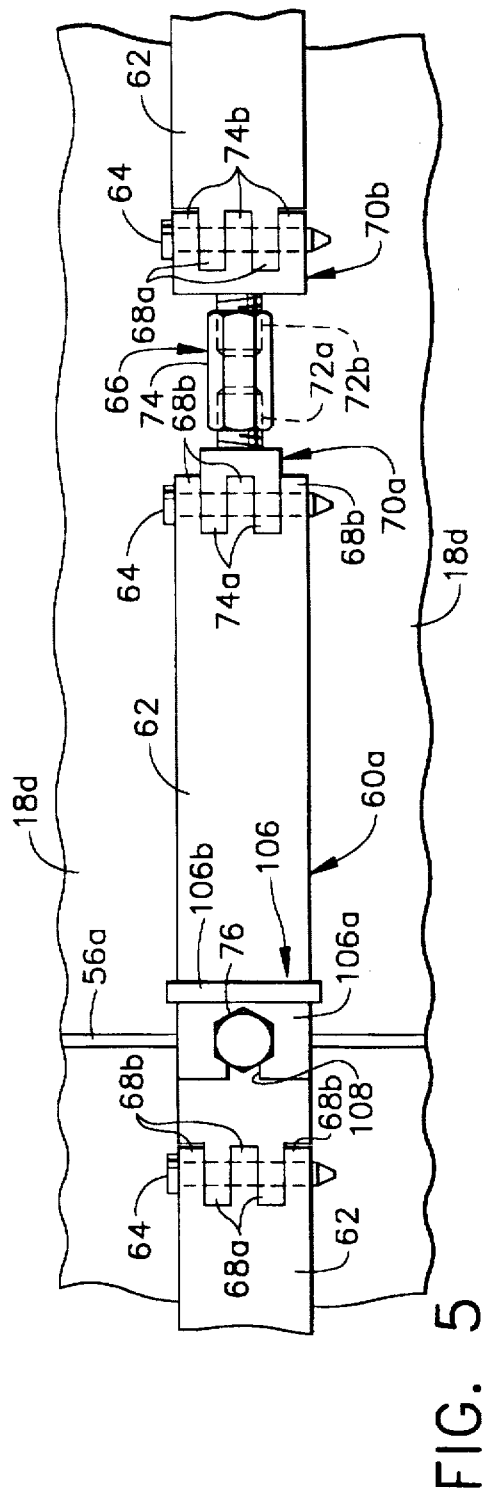
FIG. 5 is a schematic showing an elevational view of the portion of the tensioned segmented ring shown in FIG. 4.

Radial deflection limit stops can be installed at each vertical weld azimuth to limit shroud deflection in the radial direction due to cracked welds. FIGS. 4 and 5 show a radial deflection limit stop 106 comprising a base plate 106a having a slot 108 and a stop plate 106b extending radially outward from the base plate 106a. The slot 108 of the base plate receives the shaft of bolt 76. The base plate 106a is pressed against the ring segment 62 by the bolt head when bolt 76 is tightened. Rotation of the limit stop 106 about the axis of bolt 76 is prevented by an upper projection 106c and a lower projection (not shown), which respectively extend over and under the ring segment 62. For example, clockwise rotation of the limit stop will be blocked when the upper projection 106c bears against the top of the ring segment 62.

If the limit stops are installed before the vertical welds are fully cracked, some radial clearance to the vessel 10 is allowed for relative shroud to vessel seismic motion. If the vertical weld becomes fully cracked, the shroud can displace radially only by the amount of this clearance, after which it is supported by the vessel wall. This feature prevents damage to adjacent components in the shroud annulus, such as jet pumps, due to excessive radial deflection of the shroud at vertical crack locations.

Figure 6:
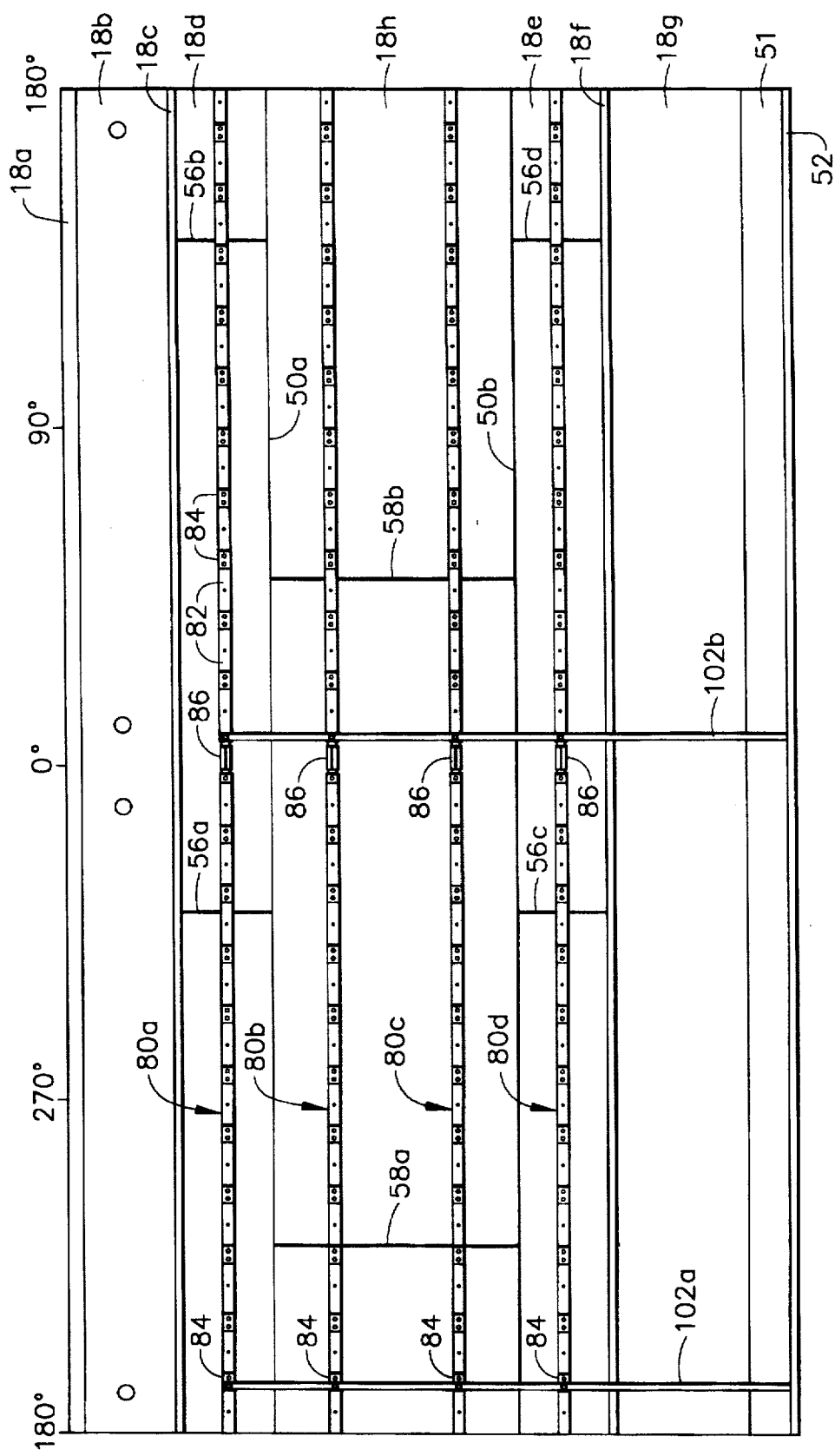
FIG. 6 is a schematic showing a developed azimuthal view of a BWR core shroud having vertical seam welds bridged by tensioned linked rings in accordance with a second preferred embodiment of the invention.

In accordance with the second preferred embodiment shown in FIG. 6, a plurality of linked rings 80a–80d are installed around the circumference of the mid-core shell sections. Each linked ring comprises a chain of arc-shaped ring links 82 tensioned by a turnbuckle 86. The ring links 82 are pivotably coupled in series by link couplings 84. The linked rings 80a–80d are vertically located by a pair of vertical struts 102a and 102b. Each vertical strut is attached at respective spaced points along its length to a respective linked ring. The bottom of each strut stands on the shroud support plate 52. Preferably, struts 102a and 102b are located at generally diametrally opposite azimuthal positions in the downcomer annulus.

The structure of the linked rings in accordance with the second preferred embodiment will be described with reference to FIGS. 7 and 8, which depict the segmented ring 80a that circumscribes the top mid-core shell section 18d. Linked rings 80b–80d shown in FIG. 6 have an identical structure.

Figure 7:
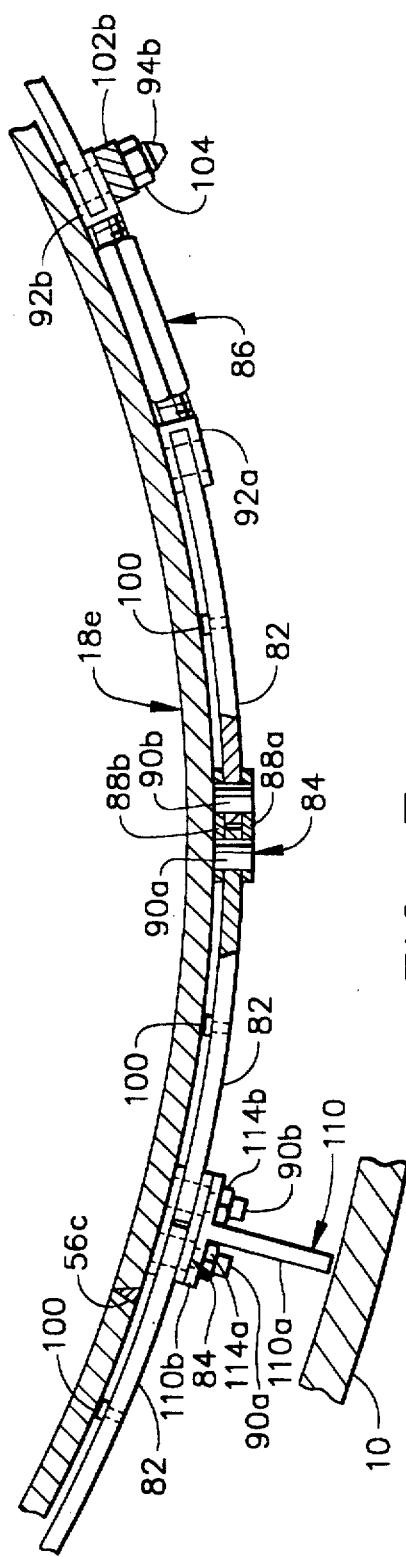
FIG. 7 is a schematic showing a sectional view of a portion of a tensioned linked ring placed around the core shroud in accordance with the second preferred embodiment.

As shown in FIG. 7 for linked ring 80a, each curved ring link 82 is pivotably coupled at opposed ends to a respective link coupling 84. Each link coupling 84 comprises two parallel side plates 88a, 88b connected by two parallel pivot pins 90a, 90b. Each pivot pin is engaged in a hole formed in an end of the adjacent arc-shaped ring link 82.

The terminal ring links in the chain are pivotably coupled to a turnbuckle 86 (shown in FIGS. 7 and 8) by respective clevis pins 94a and 94b. The turnbuckle is adjusted to produce the desired initial mechanical tensile preload in the linked ring. Turnbuckle 86 comprises a first coupling 92a connected to or integrally formed with a right-hand threaded shaft 96a and a second coupling 92b connected to or integrally formed with a left-hand threaded shaft 96b. Coupling 92a comprises a clevis which is pivotably coupled to the end of the adjacent ring link by clevis pin 94a. Similarly, coupling 92b comprises a clevis which is pivotably coupled to the end of the adjacent ring link by clevis pin 94b.

The turnbuckle 86 further comprises a sleeve 98 having a right-hand thread engaged with the right-hand thread of shaft 96a and a left-hand thread engaged with the left-hand thread of shaft 96b. As a consequence, when the sleeve is rotated in the direction of ring tensioning, the threaded shafts 96a and 96b, and the ring links coupled thereto, are pulled together. After the desired tensile preload is applied, the turnbuckle can be locked by suitable means (not shown) to prevent sleeve rotation in the direction of ring detensioning. For example, a device which bears against the shroud to prevent sleeve rotation could be engaged with the sleeve.

In accordance with the second preferred embodiment, each ring link 82 is curved whereas the link couplings 84 are straight. As seen in FIG. 7, the side plate 88b of each link coupling 84 bears against the external surface of the shroud. A respective contact pin 100 may be attached to the midportion of each ring link 82. In the fully tensioned state, the contact pins bear against the shroud and act as a spacer. The presence of the contact pins 100 reduces the bending stress at the link coupling caused by the tendency of the ring links to straighten when the ring is under tension.

In accordance with the second preferred embodiment, the linked rings 80a–80d are vertically located by a pair of vertical struts 102a, 102b installed at diametrally opposite positions in the downcomer annulus. The vertical struts serve the same purpose as that of the shear bolts discussed in the description of the first preferred embodiment. Therefore, it will be apparent to the person skilled in the art that either vertical locating device can be adapted for use with either segmented rings or linked rings.

In the arrangement depicted in FIG. 6, one vertical strut 102a is fastened at a respective elevation to a link coupling 84 of each linked ring 80a–80d. For each linked ring, this is accomplished by providing a link coupling pivot pin having a threaded extension which passes through a corresponding hole in the strut and then screwing a retainer nut onto the threaded extension to fasten the strut 102a to the link coupling. Similarly, the other vertical strut 102b is fastened at a respective elevation to a turnbuckle clevis 92b (shown in FIG. 8) of each linked ring 80a–80d. For each linked ring, this is accomplished by providing a clevis pin 94b having a threaded extension which passes through a corresponding hole in the strut 102b and then screwing a retainer nut 104 onto the threaded extension to fasten the strut 102b to the clevis. Suitable means (not shown) can be provided to prevent the vertical struts from displacing or rotating, for example, braces attached to the struts which contact existing features of the jet pumps.

Figure 8:
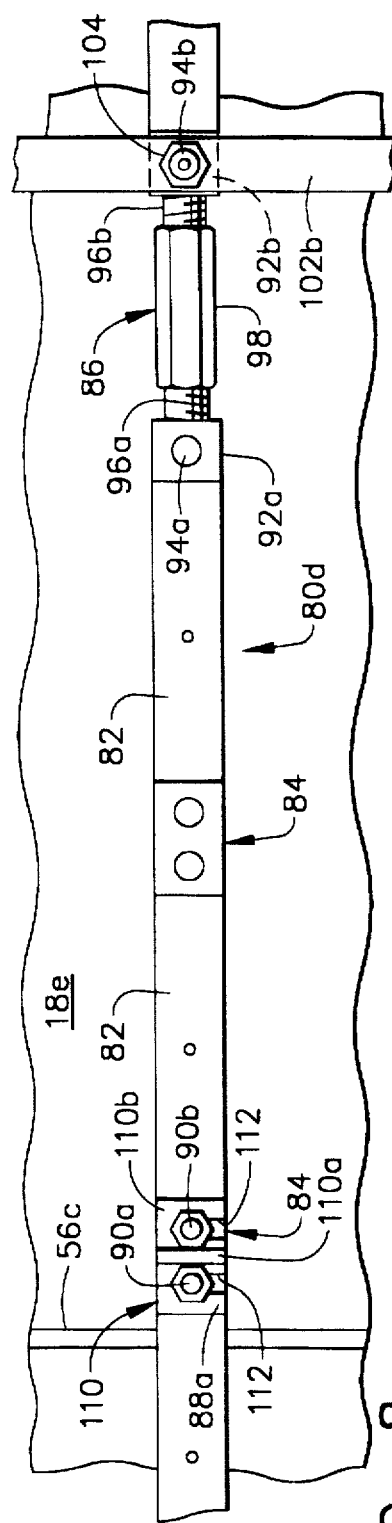
FIG. 8 is a schematic showing an elevational view of the portion of the tensioned linked ring shown in FIG. 7.

FIGS. 7 and 8 show a radial deflection limit stop 110 comprising a base plate 110b having two slots 112 and a stop plate 110a extending radially outward from the base plate 110b. The base plate slides over the threaded shafts of pivot pins 90a and 90b, and is held in place by nuts 114a and 114b tightened onto the threaded shafts of the pivot pins. As mentioned previously, a plurality of such limit stops can be arranged at azimuthal angular intervals around the shroud.

When the segmented or linked ring of the invention is tensioned during differential thermal expansion of the shroud and the ring, each of the ring segments or links can flex radially inward toward the shroud. The desired amount of flexure will depend on the design specifications, which are specific to the particular reactor being repaired. By proper design of the flexible ring segments or links, the optimum circumferential compressive thermal preloading can be produced across the vertical seam welds during startup of the reactor. In accordance with the invention, the ring segments and ring links are made of Ni—Cr—Fe alloy X-750 or other high-strength alloy with suitable fluence relaxation and corrosion resistance properties in the BWR environment.

The circumferential restraint apparatus of the invention restrains a cracked shroud against vertical joint separation by applying a thermal preload which is the result of differential thermal expansion of the shroud and the restraint apparatus. A desired differential thermal expansion preload can be attained by the selection of appropriate flexibility due to curvature of the members and appropriate coefficients of thermal expansion of the materials. For example, a typical shroud is made of Type 304 stainless steel having a mean coefficient of thermal expansion $\alpha_{304SS}=9.42\times10^{-6}$ inch/inch/° F. In contrast, the circumferential restraint assembly in accordance with a preferred embodiment of the invention comprises ring segments or links made of Ni—Cr—Fe alloy X-750, having a coefficient of thermal expansion $\alpha_{X-750}=7.50\times10^{-6}$ inch/inch/° F. By proper structural design of the foregoing components, a differential thermal expansion corresponding to a desired thermal preload to be applied to the shroud by the circumferential restraint apparatus, can be achieved. The thermal preload must be sufficient to counteract the separating forces exerted on a cracked shell section by the pressure differential between the inside and outside of the shroud.

For each ring installed, the magnitude of the thermal load applied through differential thermal expansion will be a function of the respective coefficients of thermal expansion, the respective temperature increases, and the circumferential stiffness of the curved ring segments or links. It is also necessary to apply sufficient load to account for thermal and neutron fluence-induced relaxation of the ring material. The thermal preload and tensile stress on the ring segments or links can be determined in each case using structural design and analysis techniques.

The flexible ring segments or links are installed with relatively low mechanical loads, assuring they are held in place during plant heatup. The ring thermal preload is applied during plant heatup to operating temperature, due to differential thermal expansion of the core shroud and the flexible ring assembly when the reactor changes from a cold shutdown state to a hot operating state in which nuclear heat is generated. The differential thermal expansion occurs because the ring segments and links are made of material (e.g., Ni—Cr—Fe alloy Inconel X-750) having a coefficient of thermal expansion which is less than a coefficient of thermal expansion of the shroud material (e.g., Type 304 stainless steel). This gives an operating load sufficient to prevent vertical cracked shroud joints from separating. The significant forces to be reacted at a cracked weld by the flexible ring assembly are seismic vertical shear load, pressure (hoop tension) load from core flow or loss-of-coolant accidents (LOCAs) and thermal expansion. Vertical shear load at a cracked weld is reacted by the friction between the mating surfaces which are compressed together by the preload tension in the ring.

The ring assemblies are fabricated entirely from Inconel Alloy X-750 or other high-strength alloy with suitable fluence relaxation and corrosion resistance properties in the BWR environment. No welding is required during fabrication or installation. This avoids weld residual stress and heat affected zones such as contribute to cracking in the reactor environment. For example, the ring segments or links can be fabricated from Alloy X-750 (Ni—Cr—Fe) material that has been heat treated at 1975±25° F. followed by air cooling and age hardening after machining to increase its strength. Alloy X-750 has high strength and its coefficient of thermal expansion is less than that of the shroud material. Alloy X-750 is resistant to IGSCC at the stress levels the components will experience during operation.

In accordance with the invention, the ring assemblies are installed with a small mechanical tensioning, which assures that all components are tight after installation and during cold shutdown. The ring assemblies are locked in place with mechanical devices. Thus, loose parts cannot occur without the failure of a locking device. Alternatively, ring segments or links can be fabricated from a high-strength stainless steel material having a coefficient of thermal expansion closer to that of the shroud, if the ring assemblies are installed with a large mechanical tensioning.

To mitigate conditions conducive to stress corrosion cracking of the shroud in the vicinity of the holes for shear bolts 76, the shear bolts can be coated with a noble metal (e.g., platinum or palladium) or made from material alloyed or doped with a noble metal. The noble metal will catalyze the recombination of water, thereby reducing the susceptibility of the shroud material to stress corrosion cracking. As used herein, the term "noble metal" includes platinum group metals and mixtures thereof.

The preferred embodiments of the invention have been disclosed for the purpose of illustration. Variations and modifications of the disclosed structures which do not depart from the concept of this invention will be readily apparent to mechanical engineers skilled in the art of nuclear reactor construction. For example, it should be apparent that each ring could have more than one turnbuckle. Also, more than two vertical struts and more than shear bolts can be installed around the circumference of the shroud. All such variations and modifications are intended to be encompassed by the claims set forth hereinafter.

I claim:

1. A reinforced core shroud of a nuclear reactor, comprising:
   a cylindrical shell extending vertically between first and second elevations and comprising first and second shroud sections joined by a vertical seam weld;
   a tensioned ring encircling said cylindrical shell and disposed between said first and second elevations; and
   a vertical support structure for vertically supporting said tensioned ring between said first and second elevations.

2. The reinforced shroud as defined in claim 1, wherein said cylindrical shell is made of a first material having a first coefficient of thermal expansion, and said tensioned ring is made of a second material having a second coefficient of thermal expansion, said second coefficient of thermal expansion being less than said first coefficient of thermal expansion.

3. The reinforced shroud as defined in claim 1, wherein said tensioned ring comprises a multiplicity of curved members.

4. The reinforced shroud as defined in claim 3, wherein said cylindrical shell is made of a first material having a first coefficient of thermal expansion, and said curved members of said tensioned ring are made of a second material having a second coefficient of thermal expansion, said second coefficient of thermal expansion being less than said first coefficient of thermal expansion.

5. The reinforced shroud as defined in claim 3, wherein said tensioned ring further comprises a mechanism for tensioning said curved members.

6. The reinforced shroud as defined in claim 5, wherein said tensioning mechanism comprises a turn-buckle.

7. The reinforced shroud as defined in claim 3, wherein each of said curved members has a radius of curvature different than a radius of said cylindrical shell.

8. The reinforced shroud as defined in claim 3, wherein first and second adjacent curved members are pivotably coupled by a hinge pin.

9. The reinforced shroud as defined in claim 3, wherein first and second adjacent curved members are pivotably coupled by a link coupling comprising first and second pivot pins, said first and second adjacent curved members being pivotable about said first and second pivot pins respectively.

10. The reinforced shroud as defined in claim 1, wherein said vertical support structure comprises a shear bolt which penetrates aligned holes in said cylindrical shell and in said tensioned ring.

11. A nuclear reactor comprising:
    a reactor pressure vessel;
    a core shroud arranged inside said reactor pressure vessel with an annular gap therebetween, said core shroud comprising a cylindrical shell extending vertically between first and second elevations and comprising first and second shroud sections joined by a vertical seam weld;
    a fuel core arranged inside said core shroud;
    an annular shroud support plate having an outer perimeter supported by said reactor pressure vessel and an inner perimeter which supports said core shroud, said shroud support plate disposed at a third elevation below said first and second elevations;
    a tensioned ring encircling said cylindrical shell and disposed between said first and second elevations; and
    a vertical support structure for vertically supporting said tensioned ring between said first and second elevations.

12. The nuclear reactor as defined in claim 11, wherein said tensioned ring comprises a multiplicity of curved members.

13. The nuclear reactor as defined in claim 12, wherein said cylindrical shell is made of a first material having a first coefficient of thermal expansion, and said curved members of said tensioned ring are made of a second material having a second coefficient of thermal expansion, said second coefficient of thermal expansion being less than said first coefficient of thermal expansion.

14. The nuclear reactor as defined in claim 12, wherein said tensioned ring further comprises a mechanism for tensioning said curved members.

15. The nuclear reactor as defined in claim 12, wherein each of said curved members has a radius of curvature different than a radius of said cylindrical shell.

16. The nuclear reactor as defined in claim 11, wherein said vertical support structure comprises a shear bolt which penetrates aligned holes in said cylindrical shell and in said tensioned ring.

17. The nuclear reactor as defined in claim 11, wherein said vertical support structure comprises a vertical strut which stands on said shroud support plate, said vertical strut being coupled to said tensioned ring.

18. The nuclear reactor as defined in claim 11, further comprising a radial deflection limit stop coupled to said tensioned ring.

* * * * *